US010133703B2

(12) United States Patent
Ide et al.

(10) Patent No.: US 10,133,703 B2
(45) Date of Patent: *Nov. 20, 2018

(54) ANOMALY DETECTION METHOD, PROGRAM, AND SYSTEM

(71) Applicant: International Business Machines Corporation, Armonk, NY (US)

(72) Inventors: Tsuyoshi Ide, Tokyo (JP); Tetsuro Morimura, Tokyo (JP); Bin Tong, Fukuoka (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/273,301

(22) Filed: Sep. 22, 2016

(65) Prior Publication Data
US 2017/0011008 A1    Jan. 12, 2017

Related U.S. Application Data

(63) Continuation of application No. 13/916,744, filed on Jun. 13, 2013, now Pat. No. 9,495,330.

(30) Foreign Application Priority Data

Jun. 14, 2012    (JP) ................... 2012-134319

(51) Int. Cl.
  *G06F 17/18*    (2006.01)
  *G06K 9/00*    (2006.01)
  (Continued)

(52) U.S. Cl.
  CPC ............. *G06F 17/18* (2013.01); *G01B 21/30* (2013.01); *G06K 9/00536* (2013.01);
  (Continued)

(58) Field of Classification Search
  USPC .................. 702/185; 708/306, 422
  See application file for complete search history.

(56) References Cited

U.S. PATENT DOCUMENTS 7,369,965 B2    5/2008    Mylaraswamy et al.
7,483,934 B1    1/2009    Ide et al.
(Continued)

FOREIGN PATENT DOCUMENTS

JP    07280603 A    10/1995
JP    2008058191 A    3/2008
(Continued)

OTHER PUBLICATIONS

X. Zhu, Z. Ghahramani, "Semi-Supervised Learning Using Gaussian Fields and Harmonic Functions" in Proceedings of the ICML, 2003.
(Continued)

*Primary Examiner* — Lam Nguyen
(74) *Attorney, Agent, or Firm* — Cantor Colburn LLP; David Quinn

(57) ABSTRACT

A method providing an analytical technique introducing label information into an anomaly detection model. Effective utilization of label information is based on introducing the degree of similarity between samples. Assuming, for example, there is a degree of similarity between normally labeled samples and no similarity between normally labeled and abnormally labeled samples. Also each sensor value is generated by the linear sum of a latent variable and a coefficient vector specific to each sensor. However, the magnitude of observation noise is formulated to vary according to the label information for the sensor values, and set so that normal label≤unlabeled≤anomalously labeled. A graph Laplacian is created based on the degree of similarity between samples, and determines the optimal linear transformation matrix according to a gradient method. A optimal (Continued)

linear transformation matrix is used to calculate an anomaly score for each sensor in the test samples.

23 Claims, 4 Drawing Sheets

(51) Int. Cl.
  *G06K 9/62* (2006.01)
  *G01B 21/30* (2006.01)
(52) U.S. Cl.
  CPC ......... *G06K 9/6267* (2013.01); *G06K 9/6284* (2013.01); *G06K 9/6298* (2013.01)

(56) References Cited

U.S. PATENT DOCUMENTS

2005/0193281 A1   9/2005   Ide et al.
2005/0283511 A1   12/2005  Fan et al.

FOREIGN PATENT DOCUMENTS

JP    2009076056 A    4/2009
JP    2010078467 A    4/2010
WO    2008114863 A1   9/2008

OTHER PUBLICATIONS

A.B. Goldberg, X. Zhu, and S. Wright, "Dissimilarity in Graph-Based Semi-Supervised Classification" in AISTATS, 2007.

ANOMALY DETECTION METHOD, PROGRAM, AND SYSTEM

CROSS-REFERENCE TO RELATED APPLICATION

This application is a Continuation of U.S. patent application Ser. No. 13/916,744, filed on Jun. 13, 2013, which claims priority under 35 U.S.C. § 119 from Japanese Patent Application No. 2012-134319 filed Jun. 14, 2012, the entire contents of which are incorporated herein by reference.

BACKGROUND OF THE INVENTION

Field of the Invention

The present invention relates to a technique for detecting anomalies in vehicles, industrial machinery, and the like.

Description of the Related Art

Because an accident occurring in industrial machinery at a railway or plant has significant social consequences, it is very important to detect any anomaly that can occur before an accident occurs.

In order to ensure safety, sensors have been installed in vehicles and industrial machinery at various locations to monitor operations, and the measurement data obtained from these sensors has been analyzed by computers to detect anomalies.

For example, the temperature at major locations in a vehicle can be used to detect anomalies. The temperature can be measured using a laser measuring device installed near the path of a vehicle. In this way, early anomaly detection can be performed based on the measured data.

Here, knowledge related to devices used to detect anomalies is incorporated into the computers performing the analysis.

However, anomaly detection in our knowledge base has not yet reached the point of being sufficiently reliable. At this point, the reliability of anomaly detection is being increased by using anomaly patterns detected in the past and reducing the possibility of overlooking cases similar to those in the past. The related technologies described in the following literature are known.

Laid-open Patent Publication No. 7-280603 describes the use of samples in an anomaly detecting method for machinery.

International Patent Publication No. WO2008/114863 describes the calculation of the degree of similarity between patterns of change in objects observed using diagnostic equipment.

Laid-open Patent Publication No. 2008-58191 describes the calculation of the degree of similarity between standard parameter values as confidence factors in a diagnostic method for rotating machinery.

Laid-open Patent Publication No. 2009-76056 describes the use of anomaly frequency measurements in a method used to identify anomalous values.

Laid-open Patent Publication No. 2010-78467 describes a method in which a correlation coefficient matrix is created with time-series data for testing purposes and normal time-series data for reference purposes, a sparse accuracy matrix is created in which each correlation coefficient matrix is an inverse matrix, and a localized probability distribution is created for the time-series data for testing purposes and the normal time-series data for reference purposes, preferably using the accuracy matrix in a multivariate Gaussian model.

X. Zhu, Z. Ghahramani, "Semi-Supervised Learning Using Gaussian Fields and Harmonic Functions" in Proceedings of the ICML, 2003 describes semi-supervised learning based on a Gaussian random field model, and discloses labeled data and unlabeled data represented as vertices in a weighted graph.

A. B. Goldberg, X. Zhu, and S. Wright, "Dissimilarity in Graph-Based Semi-Supervised Classification" in AISTATS, 2007 describes a semi-supervised classification algorithm in which learning occurs based on the degree of similarity and dissimilarity between labeled data and unlabeled data.

SUMMARY OF THE INVENTION

Various techniques applicable to anomaly detection have been described, including those with semi-supervised algorithms, but none have suggested the use of anomaly patterns detected in the past. In other words, the effective utilization of anomaly patterns detected in the past requires arbitrary preprocessing in prior art techniques, but this does not sufficiently increase the reliability of anomaly detection.

Therefore, it is an object of the present invention to provide an analytical technique introducing existing label information into an anomaly detection model.

It is another object of the present invention to provide an anomaly detection technique able to effectively utilize label information in data including a mix of both labeled samples and unlabeled samples.

The present invention is intended to solve these problems. The effective utilization of label information is based on the idea of introducing the degree of similarity between samples. This assumes, for example, that there is a degree of similarity between normally labeled samples and no similarity to abnormally labeled samples.

Also, it is assumed that an unlabeled sample has greater a degree of similarity to a normal sample than to an anomalous sample when it has been determined from past experience that a failure is unlikely to occur, and that an unlabeled sample has an equal degree of similarity to a normal sample and to an anomalous sample when there is no previous information.

Each normalized sample is expressed by a multi-dimensional vector in which each element is a sensor value. The present invention also assumes that each sensor value is generated by the linear sum of a latent variable and a coefficient vector specific to each sensor. However, the magnitude of observation noise is formulated to vary according to the label information for the sensor values. The observation noise is set so that normally labeled≤unlabeled≤anomalously labeled.

Next, a graph Laplacian is created based on the degree of similarity between samples, the graph Laplacian is used to determine the optimal linear transformation matrix according to the gradient method or the like.

When the optimal linear transformation matrix has been obtained, an anomaly score is calculated for each sensor in the test samples according to the technique described in the Patent Application No. 2011-206087 filed by the present applicant.

The present invention is able to reduce the arbitrariness of criteria for anomaly detection and increase the reliability of anomaly detection by incorporating samples of anomaly patterns and normal patterns detected in the past into an anomaly detection model.

BRIEF DESCRIPTION OF DRAWINGS

FIG. 4 is a flowchart of the process for calculating anomaly scores using model parameters and the like.

DETAILED DESCRIPTION OF THE PREFERRED EMBODIMENT

The following is an explanation of an example of the present invention with reference to the drawings. The same reference numbers are used to denote the same objects in all of the drawings except where otherwise indicated. The following explanation is a single embodiment of the present invention. The present invention is by no means intended to be limited to the content explained in the example.

Figure 1:
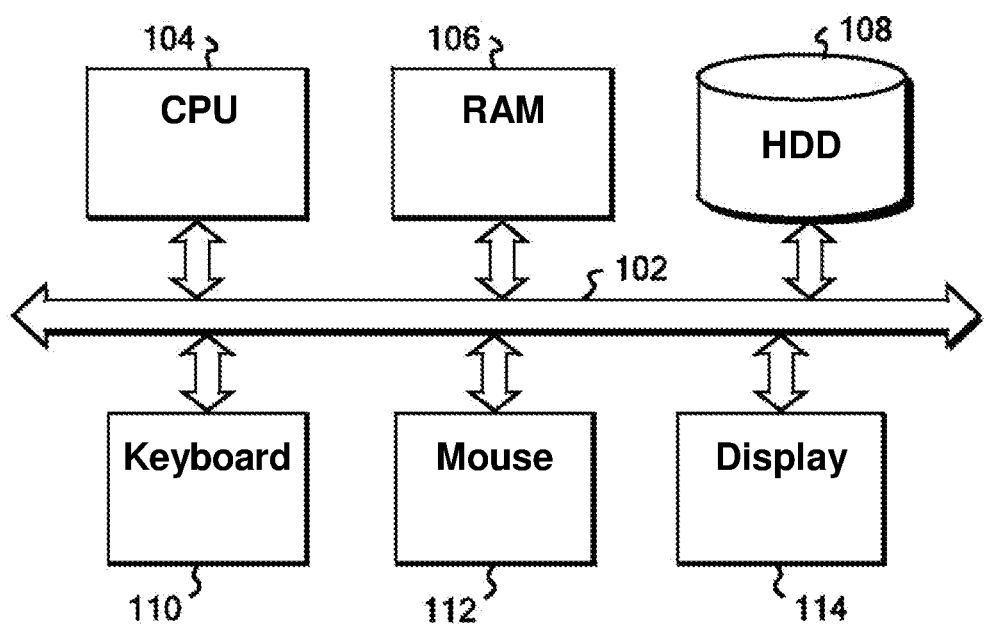
FIG. 1 is a block diagram showing an example of a computer hardware configuration used to embody the present invention.

FIG. 1 is a block diagram of computer hardware used to realize the system configuration and processing in an example of the present invention. In FIG. 1, a CPU 104, main memory (RAM) 106, a hard disk drive (HDD) 108, a keyboard 110, a mouse 112, and a display 114 are connected to a system bus 102. The CPU 104 is preferably based on 32-bit or 64-bit architecture, and can be a Pentium® 4, Core® 2 Duo or Xeon® from Intel Corporation, or an Athlon® from Advanced Micro Devices, Inc. The main memory 106 preferably has a capacity of 4 GB or more. The hard disk drive 108 preferably has a capacity of 500 GB or more in order to store a large amount of data.

While not shown in any of the drawings, the hard disk drive 108 includes a pre-installed operating system. The operating system can be any operating system compatible with the CPU 104. Examples include Windows XP® or Windows® 7 from Microsoft Corporation, or MacOS® from Apple, Inc.

The hard disk drive 108 also contains, as explained below with reference to FIG. 2, a main program 202, labeled data 204, unlabeled data 206, a parameter group 208, a graph Laplacian calculation routine 210, a parameter optimization routine 212, and an anomaly detection routine 214. The main program 202, graph Laplacian calculation routine 210, parameter optimization routine 212, and anomaly detection routine 214 can be written in any existing programming language, including Java®, C, C++, or C#.

The keyboard 110 and mouse 112 operate on the operating system or main program 202 loaded from hard disk drive 108 into main memory 106 and displayed on display 114, and are used to enter characters.

The display 114 is preferably a liquid crystal display. Any resolution can be used, including XGA (resolution: 1024×768) or UXGA (resolution: 1600×1200). While not shown in the drawings, display 114 is used to display operating windows for entering parameters and starting programs, and to display parameter calculation results and the like.

Figure 2:
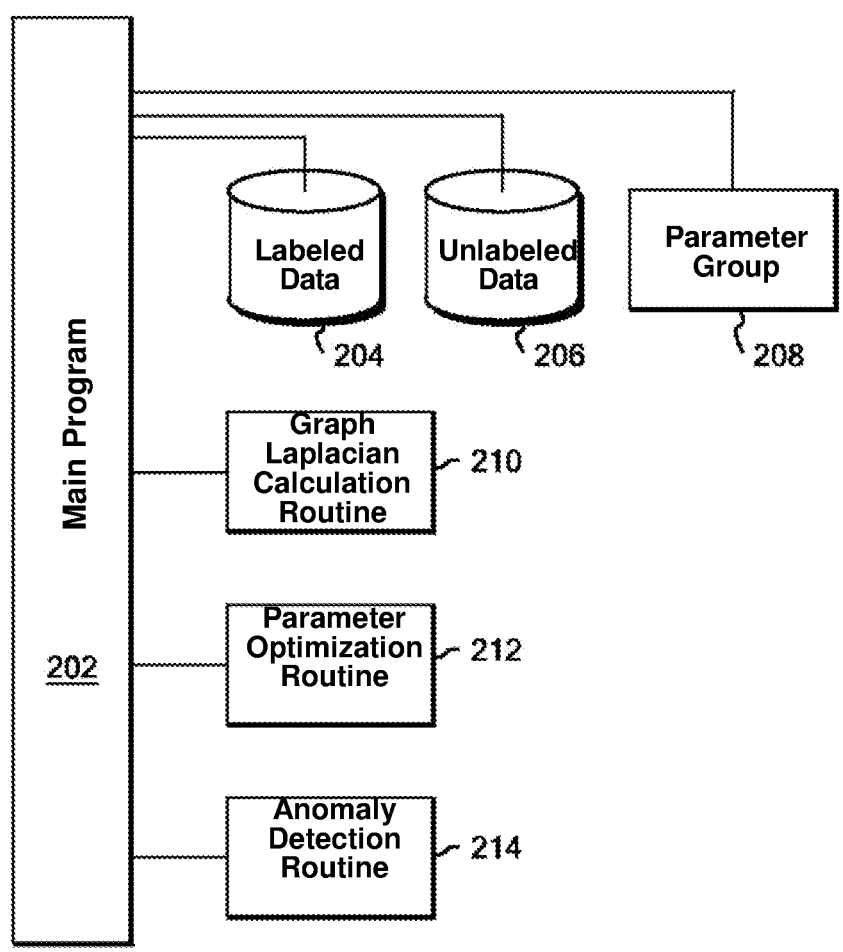
FIG. 2 is a block diagram showing a function configuration used to embody the present invention.

The following is an example of a functional configuration of the processing in the present invention with reference to the block diagram in FIG. 2.

In FIG. 2, the main program 202 is a program with functions integrating all of the processing. This is used by the operator to set a parameter group 208, start the graph Laplacian calculation routine 210, parameter optimization routine 212, and anomaly detection routine 214, execute calculations, and display results on display 114.

Labeled data 204 includes data detected in the past that has been found to be anomalous or normal. An anomaly label is applied to data found to be anomalous, and a normal label is applied to data found to be normal.

Unlabeled data 206 includes unlabeled data that has not been found to be either anomalous or normal. Depending on the situation, it is treated as either labeled data 204 or unlabeled data 206.

A single unit of data (called a sample) is a D-dimensional real vector consisting of type-D sensor values. A set of sensor data can be expressed by the equation $X=[X1, \ldots, XN]^T \in R^{N \times D}$, where N is the number of samples.

Sensor data set X is preferably data normalized based on the original sensor data set $X'=[X'1, \ldots, X'N]^T \in R^{N \times D}$. The normalization is performed based on the following equation. Here, $X_{n,d}$ is the $d^{th}$ element of vector Xn. The same is true of $X'_{n,d}$.

$$\mu_d = \frac{1}{N} \sum_{n=1}^{N} X'_{n,d}$$

$$\sigma_d = \sqrt{\frac{1}{N} \sum_{n=1}^{N} (X'_{n,d} - \mu_d)^2}$$

$$X_{n,d} = \frac{X'_{n,d} - \mu_d}{\sigma_d}$$

Equation 1

Also, label information $Y=[Y1, \ldots, YN]^T \in R^{N \times D}$ is provided for each sensor data set $X=[X1, \ldots, XN]^T \in R^{N \times D}$. While not shown in the drawings, this is stored along with the labeled data 204 and the unlabeled data 206 in the hard disk drive 108.

The label information Y is defined as follows.

$$Y_{n,d} = \begin{cases} 0 & \text{if normal,} \\ 1 & \text{if anomaly,} \\ NaN & \text{if unlabel,} \end{cases}$$

Equation 2

Here, NaN is any real number other than 0 or 1.

In the present invention, it is assumed that each sensor value $X_{n,d}$ in each normalized sample Xn is expressed as follows with a latent variable $Z_n \in R^{D'}$ (D'≤D), coefficients for the magnitude of noise for each label, snormal, sanomaly, sunlabel, and Gaussian noise ε with a mean of 0 and a variance of 1. Here, snormal corresponds to normal, sanomaly corresponds to anomalous, and sunlabel corresponds to unlabeled. Also, D' is usually equal to D, but D' is set to about 100 when D is very large and the number of data units N is small.

$$X_{n,d} = \begin{cases} W_d^T Z_n + s_{normal}\epsilon, & \text{if } Y_{n,d} = 0 \\ W_d^T Z_n + s_{anomaly}\epsilon, & \text{if } Y_{n,d} = 1 \\ W_d^T Z_n + s_{unlabel}\epsilon, & \text{otherwise} \end{cases}$$

Equation 3

Here, the setting is snormal sunlabel sanomaly. Specific examples include snormal=1, sunlabel=3, sanomaly=5 if nothing is found; snormal=1, sunlabel=2, sanomaly=5 if the unlabeled data is found to be mostly normal; and snormal=1, sunlabel=4, sanomaly=5 if the unlabeled data is found to be mostly anomalous.

The parameter group 208 includes parameters such as noise magnitudes snormal, sanomaly, sunlabel, a scale parameter λ, and the numbers of dimensions D, D'. These are stored in the hard disk drive 108, and can be set by the user.

The parameter group 208 also includes values used to determine a similarity matrix R. The similarity matrix is a N×N square matrix, where N is the number of samples, each row and each column correspond to samples (for example, row i/column j corresponds to the degree of similarity between the $i^{th}$ and $j^{th}$ samples), an element corresponding to a normal (labeled) sample and a normal sample is positive number a, an element corresponding to a normal sample and an anomalous sample is non-positive number b, an element corresponding to a normal sample and an unlabeled sample is c, an element corresponding to an anomalous sample and an anomalous sample is d, an element corresponding to an anomalous sample and an unlabeled sample is e, and an element corresponding to an unlabeled sample and an unlabeled sample is f. Here, a, b, c, d, e, and f satisfy the relationships b≤c≤a and e≤d≤f.

Preferably, a, b and d above are set as a=1, b=0, d=0.2.

As in the case of sunlabel, the settings for c, e and f depend on what the algorithm user has discovered regarding the unlabeled data in the application data.

Namely:

c=0.5, e=0.1, f=0.5, for example, if nothing is found;

c=0.8, e=0, f=0.8, for example, if the unlabeled data is found to be mostly normal; and c=0, e=0.1, f=0.2, for example, if the unlabeled data is found to be mostly anomalous.

[0045]

The graph Laplacian calculation routine 210 creates a similarity matrix R based on the values a, b, c, d, e, f set in the parameter group 208, and then calculates a graph Laplacian L from the resulting similarity matrix R in the following way.

$$K_{i,i} = \sum_{d=1}^{N} R_{i,d}$$ Equation 4

$$L = K - R$$

The latent variable $Z \equiv [Z1, \ldots, ZN]^T \in R^{N \times D'}$ is realized by means of the graph Laplacian L as follows.

$$Pr(Z) \propto \exp\left\{-\frac{\lambda}{2} \text{tr}(Z^T L Z)\right\}$$ Equation 5

Because the probability Pr(X|W, Z, s) of $X \equiv [X1, \ldots, XN]^T \in R^{N \times D}$ can be regarded as a likelihood function of parameter $W \equiv [W1, \ldots, WD]^T \in R^{D \times D'}$ and Z, parameter optimization routine 212 seeks (W*, Z*) using, for example, the gradient method so that the posterior probability is optimized. This process will be explained in greater detail below with reference to the flowchart in FIG. 3.

The anomaly detection routine 214 calculates the anomaly score for each variable based on (W*, Z*) obtained in this manner. The anomaly detection routine 214 preferably uses the technique described in Patent Application No. 2011-206087 filed by the present applicant. The processing in the anomaly detection routine 214 will be explained in greater detail below with reference to the flowchart in FIG. 4.

Figure 3:
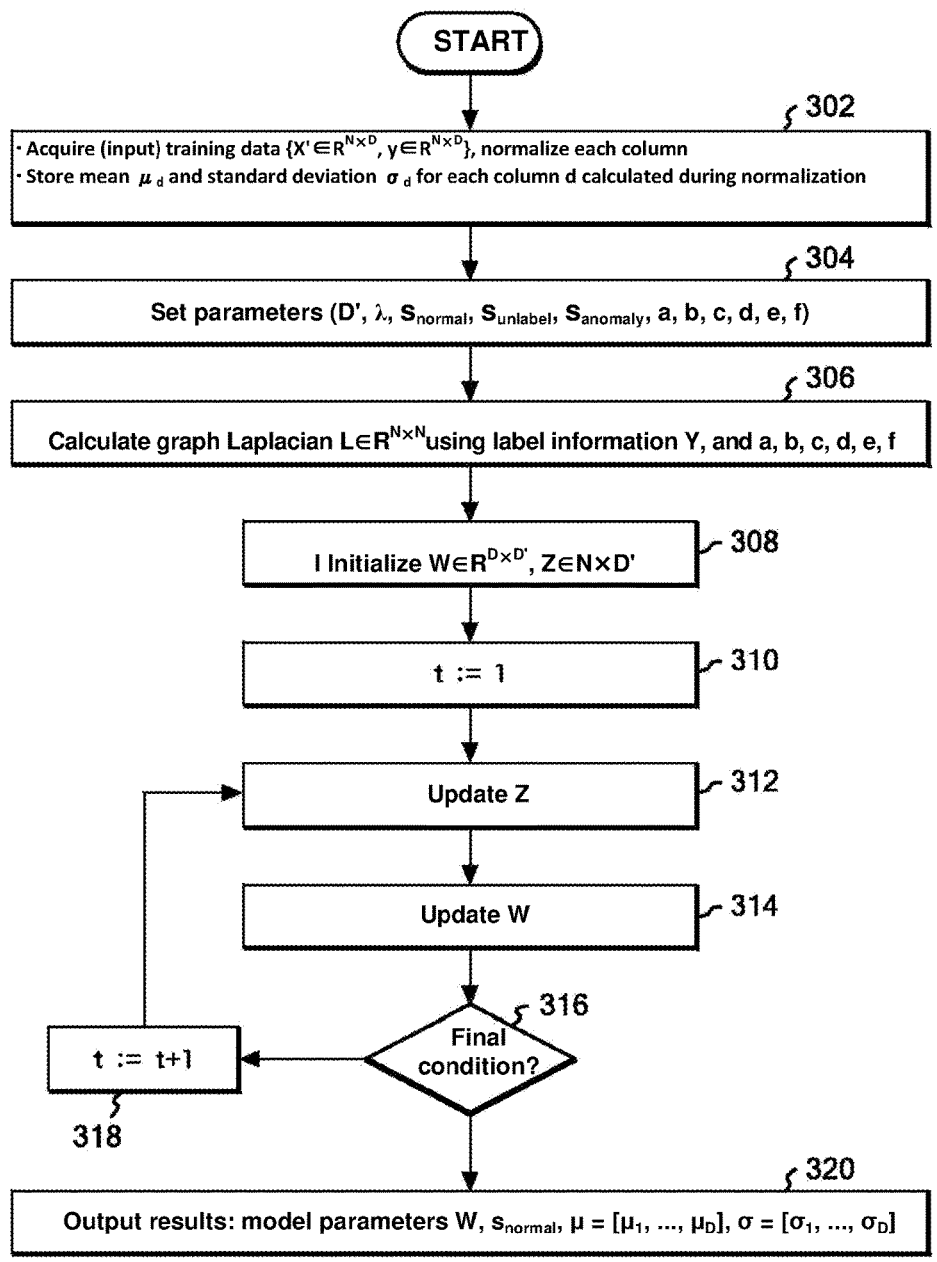
FIG. 3 is a flowchart of the process for calculating model parameters for anomaly detection according to the present invention.

The following is an explanation of the processing used to determine the model parameters (optimal linear transformation matrix) W* and the like with reference to the flowchart in FIG. 3.

In Step 302 of FIG. 3, main program 202 inputs training data $\{X' \in RN \times D, y\}$ by retrieving labeled data 204 and unlabeled data 206 from hard disk drive 108, normalizes the data in the manner described above, and stores the mean μd and standard deviation σd of each column d calculated when each column was normalized.

In Step 304, main program 202 retrieves parameter D', scale parameter λ, snormal, sunlabel, sanomaly, a, b, c, d, e, and f from the parameter group 208 or enters them into a setting screen (not shown) using keyboard 110 and mouse 112. The scale parameter λ can be set, for example, to 0.1, and the noise magnitude and the like are determined as indicators using the cross-validation method.

In Step 306, main program 202 calls up the graph Laplacian calculation routine 210, and a graph Laplacian L is calculated using label information Y and a, b, c, d, e, and f. Because the graph Laplacian L calculation has already been explained with reference to FIG. 2, further explanation has been omitted here.

In Step 308, the main program 202 initiates $W \in R^{D \times D'}$ and $Z \in R^{N \times D'}$. Any method can be used to perform the initialization. However, W and Z are initialized with a standard normal distribution, that is, a value of each element of W or Z is set to a realized value of a normal distribution in which the mean is 0 and the standard deviation is 1.

In Step 310, the main program 202 sets the time variable t to 1.

In Step 312, the main program 202 updates W in accordance with the following equation.

$$W := W - \alpha[\{S \cdot (X - ZW^T)\}^T Z + N(WW^T)^{-1} W]$$ Equation 6

Here, S is described as follows.

$$\{S\}_{n,d} = \begin{cases} \sqrt{\dfrac{1}{S_{normal}}} & \text{if } Y_{n,d} = 0 \\ \sqrt{\dfrac{1}{S_{anomaly}}} & \text{if } Y_{n,d} = 1 \\ \sqrt{\dfrac{1}{S_{unlabel}}} & \text{otherwise} \end{cases}$$ Equation 7

The operation $S \cdot (X - ZW^T)$ means elements n, d of matrix $(X - ZW^T)$ are multiplied by elements n, d of S. Also, α is the learning rate and is set, for example, to 0.1. The value of α needs not be constant. It can be reduced with each iteration.

In Step 314, the main program 202 updates Z in accordance with the following equation.

$$Z := Z - \alpha[\{S \cdot (X - ZW^T)\} W + \lambda L Z]$$ Equation 8

This equation is used to perform calculations so that the parameters are updated in accordance with an update equation with a term that reduces the penalty based on the degree of similarity. This includes a term that reduces the penalty based on the degree of similarity to the latent variable of each observation. More specifically, it has been formulated so that the penalty based on the degree of similarity is the Mahalanobis distance based on the similarity matrix (or graph Laplacian). It is then calculated to converge in accordance with the gradient method.

Step 312 and Step S314 do not have to be calculated in this order. The order can be switched.

After Step 314, main program 202, in Step 316, determines the termination conditions. Here, the Frobenius norm is calculated for the matrix W' calculated in the previous loop and the matrix W calculated in the current loop, and the termination conditions are satisfied when this is within, for example, 0.001 of a predetermined threshold value.

$$\|W' - W\|_F = \sqrt{\sum_{i=1}^{D} \sum_{j=1}^{D'} (W'_{i,j} - W_{i,j})^2} \quad \text{Equation 9}$$

In Step 318, main routine 202 increases t by "1", and returns to Step 312 when the termination conditions have not been satisfied.

In Step 320, main program 202 outputs the model parameters W, snormal, $\mu=[\mu 1, \ldots, \mu D]$, and $\sigma=[\sigma 1, \ldots, \sigma D]$ when the termination conditions have been satisfied.

Figure 4:
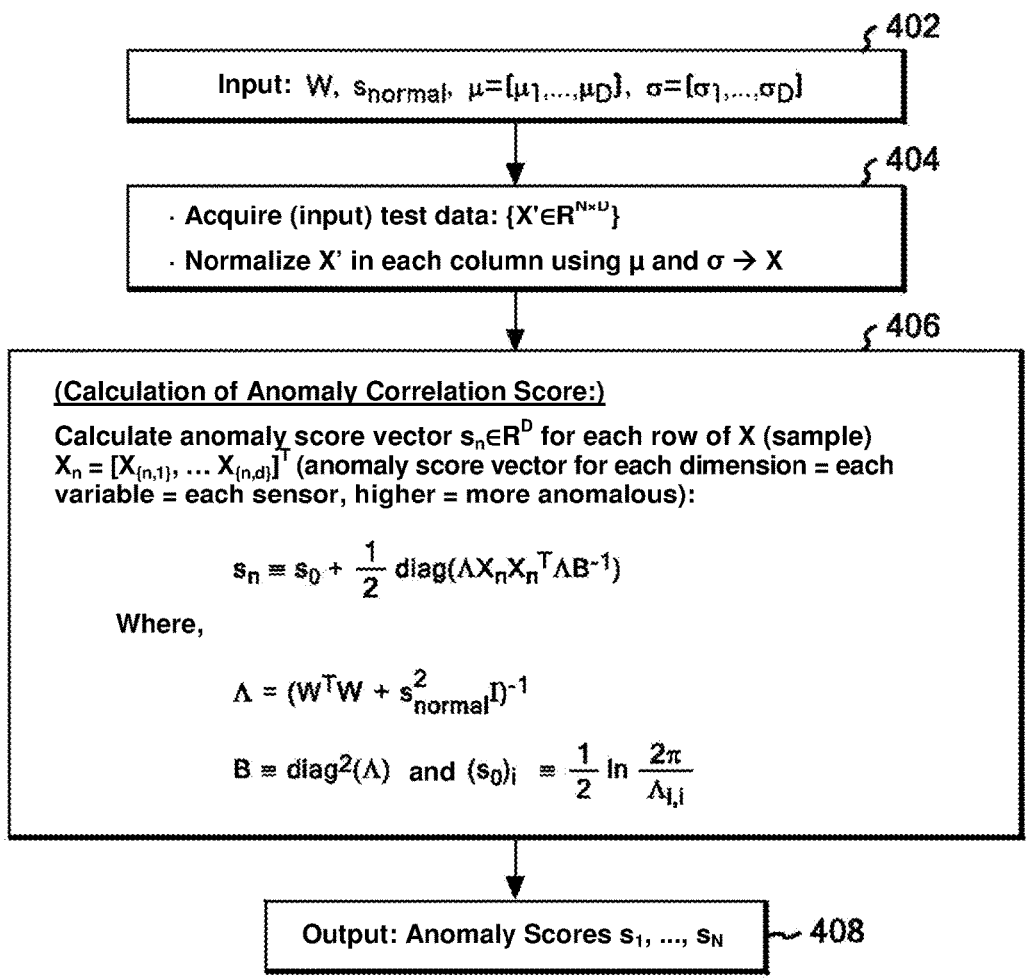

The following is an explanation of the anomaly score calculation processing performed in anomaly detection routine 214 with reference to the flowchart in FIG. 4.

In Step 402 of FIG. 4, main program 202 calls up anomaly detection routine 214, and provides model parameters W, snormal, $\mu=[\mu 1, \ldots, \mu D]$, $\sigma=[\sigma 1, \ldots, \sigma D]$.

In Step 404, the anomaly detection routine 214 inputs test data $\{X' \in R^{N \times D}, y\}$ by retrieving labeled data 204 and unlabeled data 206 from hard disk drive 108, X' in each column is normalized according the equation described above using $\mu$ and $\sigma$, and X is obtained.

In Step 406, the anomaly detection routine 214 calculates the correlation anomaly score vector $sn \in R^D$ using the following equation.

$$s_n \equiv s_0 + \frac{1}{2}\text{diag}(AX_n X_n^T AB^{-1}) \quad \text{Equation 10}$$

Provided, $$A = (W^T W + s_{normal}^2 I)^{-1} \quad \text{Equation 11}$$
$$B \equiv \text{diag}^2(A)$$
$$(s_0)_i \equiv \frac{1}{2}\ln\frac{2\pi}{A_{i,i}}$$

Here, I is a unit matrix. The algorithm used to calculate the correlation anomaly score vector based on the optimal linear transformation matrix W is described in Patent Application No. 2011-206087 filed by the present applicant. It is not described in detail here.

In Step 408, anomaly detection routine 214 outputs anomaly score vectors s1, . . . , sN based on these calculations. Each element of s1, . . . , or sN is an anomaly score for each sensor of the first, second, . . . , or N$^{th}$ test sample, that is, each dimension of s=each variable. A higher value indicates an anomaly.

The anomaly detection for industrial machinery at a railway or plant in the present invention was explained with reference to an example. However, the present invention is not limited to this. It can be applied to any example in which anomaly detection is performed based on a plurality of measurement parameters.

What is claimed is:

1. A computer implemented method to detect an anomaly based on measurement data, the method comprising the steps of:
   determining a similarity matrix indicating a relationship between measurement data;
   defining a penalty based on the similarity matrix and calculating parameters in accordance with an updating equation having a term reducing the penalty; and
   calculating a degree of anomaly based on the calculated parameters.

2. A method according to claim 1 further comprising: the step of calculating a graph Laplacian from the similarity matrix prior to the step of calculating the parameters, the step for calculating the parameters using the calculated graph Laplacian.

3. A method according to claim 2, wherein the penalty based on the similarity is a Mahalanobis distance based on the similarity matrix or graph Laplacian.

4. A method according to claim 1, wherein the similarity matrix is a N×N square matrix, where N is the number of samples, each row and each column corresponding to samples, an element corresponding to a normal (labeled) sample and a normal sample being positive number a, an element corresponding to a normal sample and an anomalous sample being non-positive number b, an element corresponding to a normal sample and an unlabeled sample being c, an element corresponding to an anomalous sample and an anomalous sample being d, an element corresponding to an anomalous sample and an unlabeled sample being e, and an element corresponding to an unlabeled sample and an unlabeled sample being f.

5. A method according to claim 4, wherein a, b, c, d, e, and f are b≤c≤a, e≤d≤f.

6. A method according to claim 5, wherein c and f are a value equal to or approximate to a, and e is a value equal to or approximate to b on condition that an unlabeled sampled can be assumed to be a normal sample.

7. A method according to claim 5, wherein c is a value equal to or approximate to b, and e and f are a value equal to or approximate to d on condition that an unlabeled sampled can be assumed to be an anomalous sample.

8. A method according to claim 1, wherein observed values serving as samples use a model determined by a latent variable, an inner product of parameters, and a noise term.

9. A method according to claim 8, wherein the noise term depends on whether a sample is a normal sample, anomalous sample, or unlabeled sample, so that the noise term of a normal sample≤the noise term of an unlabeled sample≤the noise term of an anomalous sample.

10. A computer executed program to detect an anomaly based on measurement data, the program executing in a computer the steps of:
    determining a similarity matrix indicating a relationship between measurement data;
    defining a penalty based on the similarity matrix and calculating parameters in accordance with an updating equation having a term reducing the penalty; and
    calculating a degree of anomaly based on the calculated parameters.

11. A program according to claim 10 further comprising the step of: calculating a graph Laplacian from the similarity matrix prior to the step of calculating the parameters, the step for calculating the parameters using the calculated graph Laplacian.

12. A program according to claim 11, wherein the penalty based on the similarity is a Mahalanobis distance based on the similarity matrix or graph Laplacian.

13. A program according to claim 10, wherein the similarity matrix is a N×N square matrix, where N is the number of samples, each row and each column corresponding to samples, an element corresponding to a normal (labeled) sample and a normal sample being positive number a, an element corresponding to a normal sample and an anomalous sample being non-positive number b, an element corresponding to a normal sample and an unlabeled sample being c, an element corresponding to an anomalous sample and an anomalous sample being d, an element corresponding to an anomalous sample and an unlabeled sample being e, and an element corresponding to an unlabeled sample and an unlabeled sample being f.

14. A program according to claim 13, wherein a, b, c, d, e, and f are b≤c≤a, e ≤d≤f.

15. A program according to claim 14, wherein c and f are a value equal to or approximate to a, and e is a value equal to or approximate to b on condition that an unlabeled sample can be assumed to be a normal sample.

16. A program according to claim 14, wherein c is a value equal to or approximate to b, and e and f are a value equal to or approximate to d on condition that an unlabeled sample can be assumed to be an anomalous sample.

17. A program according to claim 10, wherein observed values serving as samples use a model determined by a latent variable, an inner product of parameters, and a noise term.

18. A program according to claim 17, wherein the noise term depends on whether a sample is a normal sample, anomalous sample, or unlabeled sample, so that the noise term of a normal sample≤the noise term of an unlabeled sample≤the noise term of an anomalous sample.

19. A computer implemented system to detect an anomaly based on measurement data, the system comprising:
storage means;
means for determining a similarity matrix indicating a relationship between measurement data;
means for defining a penalty based on the similarity matrix and for calculating parameters in accordance with an updating equation having a term reducing the penalty; and
means for calculating a degree of anomaly based on the calculated parameters.

20. A system according to claim 19 further comprising the step of: calculating a graph Laplacian from the similarity matrix prior to the step of calculating the parameters, the step for calculating the parameters using the calculated graph Laplacian.

21. A system according to claim 20, wherein the penalty based on the similarity is a Mahalanobis distance based on the similarity matrix or graph Laplacian.

22. A system according to claim 19, wherein the similarity matrix is a N×N square matrix, where N denotes the number of samples, each row and each column corresponding to samples, an element corresponding to a normal (labeled) sample and a normal sample being positive number a, an element corresponding to a normal sample and an anomalous sample being non-positive number b, an element corresponding to a normal sample and an unlabeled sample being c, an element corresponding to an anomalous sample and an anomalous sample being d, an element corresponding to an anomalous sample and an unlabeled sample being e, and an element corresponding to an unlabeled sample and an unlabeled sample being f.

23. A system according to claim 22, wherein a, b, c, d, e, and f are b≤c≤a, e≤d≤f.

* * * * *